US012305535B2

(12) United States Patent
Guijarro Valencia et al.

(10) Patent No.: US 12,305,535 B2
(45) Date of Patent: May 20, 2025

(54) TURBINE ENGINE HAVING A COMPRESSOR WITH AN INDUCER

(71) Applicants: GENERAL ELECTRIC COMPANY, Schenectady, NY (US); General Electric Deutschland Holding GmbH, Frankfurt (DE)

(72) Inventors: Antonio Guijarro Valencia, Munich (DE); Scott Alan Schimmels, Miamisburg, OH (US); Steven Douglas Johnson, Milford, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/970,918

(22) Filed: Oct. 21, 2022

(65) Prior Publication Data

US 2024/0133303 A1 Apr. 25, 2024
US 2024/0229658 A9 Jul. 11, 2024

(51) Int. Cl.
*F01D 9/04* (2006.01)

(52) U.S. Cl.
CPC ........ *F01D 9/041* (2013.01); *F05D 2240/128* (2013.01); *F05D 2250/323* (2013.01); *F05D 2250/38* (2013.01); *F05D 2260/2212* (2013.01); *F05D 2260/606* (2013.01); *F05D 2260/97* (2013.01)

(58) Field of Classification Search
None
See application file for complete search history.

(56) References Cited

U.S. PATENT DOCUMENTS

| | | | |
|---|---|---|---|
| 4,415,310 A | 11/1983 | Bouiller et al. | |
| 4,541,774 A | 9/1985 | Rieck et al. | |
| 5,205,706 A | 4/1993 | Belcher | |
| 6,279,322 B1 | 8/2001 | Moussa | |
| 6,325,595 B1 | 12/2001 | Breeze-Stringfellow et al. | |
| 6,361,277 B1 | 3/2002 | Bulman et al. | |
| 6,663,346 B2 * | 12/2003 | Munsell | F02C 6/08 415/115 |
| 7,442,006 B2 | 10/2008 | Nguyen et al. | |
| 8,172,506 B2 | 5/2012 | Pieczka et al. | |
| 9,567,914 B2 | 2/2017 | Twell | |
| 10,502,132 B2 | 12/2019 | Guijarro Valencia et al. | |
| 10,577,966 B2 * | 3/2020 | Subramanian | F04D 29/321 |
| 11,098,601 B2 | 8/2021 | King et al. | |

(Continued)

FOREIGN PATENT DOCUMENTS

CN 112211853 A 1/2021

OTHER PUBLICATIONS

Farthing et al, "The Use of De-Swirl Nozzles to Reduce the Pressure Drop in a Rotating Cavity with a Radial Inflow", Gas Turbine and Aeroengine Congress and Exposition—Jun. 4-8, 1989—Toronto, Ontario, Canada, 10 pgs.

*Primary Examiner* — Juan G Flores
(74) *Attorney, Agent, or Firm* — McGarry Bair PC

(57) ABSTRACT

A turbine engine having a rotor rotatable about a rotational axis, a stator, a plurality of circumferentially spaced bleed air passages, and an inducer. The plurality of circumferentially spaced bleed air passages being located between an axially adjacent set of vanes of the stator and blades of the rotor. The inducer including a nozzle passage fluidly coupling a nozzle inlet of the inducer to a nozzle outlet of the inducer.

20 Claims, 7 Drawing Sheets

(56) References Cited

U.S. PATENT DOCUMENTS

| | | | | |
|---|---|---|---|---|
| 11,098,730 | B2 | 8/2021 | Mazur | |
| 11,725,530 | B1 * | 8/2023 | Subramanian .......... | F01D 9/065<br>415/191 |
| 2003/0033815 | A1 | 2/2003 | Proctor et al. | |
| 2003/0133796 | A1 * | 7/2003 | Munsell .................... | F02C 6/08<br>416/97 R |
| 2004/0028529 | A1 | 2/2004 | Austin et al. | |
| 2017/0002678 | A1 * | 1/2017 | Subramanian ........ | F04D 29/542 |
| 2020/0248571 | A1 | 8/2020 | King et al. | |
| 2020/0332669 | A1 | 10/2020 | Tardif et al. | |
| 2020/0386109 | A1 | 12/2020 | Becker | |
| 2022/0018310 | A1 | 1/2022 | Tumes | |

* cited by examiner

TURBINE ENGINE HAVING A COMPRESSOR WITH AN INDUCER

TECHNICAL FIELD

The present subject matter relates generally to a turbine engine, and more specifically to a specifically to components of a compressor section of a turbine engine.

BACKGROUND

Turbine engines, and particularly gas turbine engines, are rotary engines that extract energy from a flow of working air passing serially through a compressor section, where the working air is compressed, a combustor section, where fuel is added to the working air and ignited, and a turbine section, where the combusted working air is expanded and work taken from the working air to drive the compressor section along with other systems, and provide thrust in an aircraft implementation. A drive shaft can operably couple the turbine section, the compressor section, and the fan section such that rotation of the turbine section drives the compressor section and the fan section.

Bleed air can be taken from an upstream portion of the turbine engine (e.g., the fan section or compressor section) and be fed to a downstream portion of the turbine engine to cool said downstream portion of the turbine engine. At least a portion of the bleed air can be fed through a channel formed within a rotor of the turbine engine. Some engines include structure provided on stationary portions of the turbine engine that direct or feed the bleed air into the channel, where it is ultimately fed to the downstream portion of the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
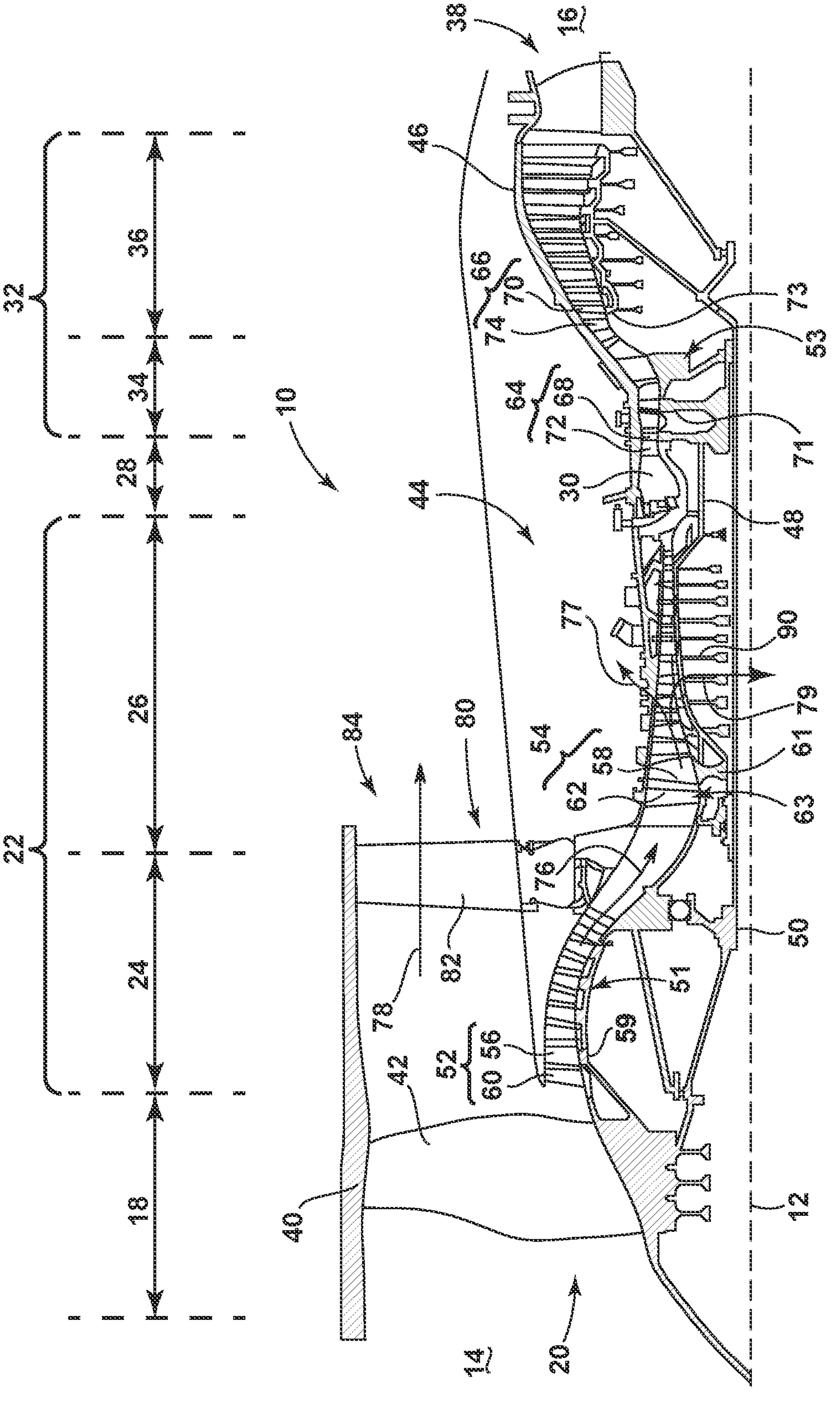
FIG. 1 is a schematic cross-sectional view of a turbine engine in accordance with an exemplary embodiment of the present disclosure, the turbine engine including a compressor section.

Aspects of the disclosure herein are directed to a turbine engine including a compressor section, a combustion section and a turbine section, in serial flow arrangement. The turbine engine includes a rotor rotatable about a rotational axis and having a plurality of sets of circumferentially arranged blades axially spaced along the rotational axis from one another. The turbine engine includes a stator having annularly arranged inner and outer bands circumscribing the rotor and the plurality of sets of circumferentially arranged vanes extending between the inner and outer bands. An inducer extends from the stator. The inducer includes a plurality of circumferentially-spaced nozzles that direct a fluid flow towards a portion of the rotor. At least a portion of the fluid is used as bleed air in a downstream portion of the turbine engine.

The inducer is designed to direct a flow of fluid into a bleed air passage formed within the rotor without sacrificing the efficiency of the turbine engine. For purposes of illustration, the present disclosure will be described with respect to an inducer provided within the turbine engine, specifically an inducer provided within the compressor section of the turbine engine. It will be understood, however, that aspects of the disclosure described herein are not so limited and can have general applicability within other engines. For example, the disclosure can have applicability for a stator or airfoil assembly including the inducer in other engines or vehicles, and can be used to provide benefits in industrial, commercial, and residential applications.

As used herein, the term “upstream” refers to a direction that is opposite the fluid flow direction, and the term “downstream” refers to a direction that is in the same direction as the fluid flow. The term “fore” or “forward” means in front of something and “aft” or “rearward” means behind something. For example, when used in terms of fluid flow, fore/forward can mean upstream and aft/rearward can mean downstream.

Additionally, as used herein, the terms “radial” or “radially” refer to a direction away from a common center. For example, in the overall context of a turbine engine, radial refers to a direction along a ray extending between a center longitudinal axis of the engine and an outer engine circumference. Furthermore, as used herein, the term “set” or a “set” of elements can be any number of elements, including only one.

Further yet, as used herein, the term “fluid” or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term “fluid” can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader’s understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a turbine engine 10 for an aircraft. The turbine engine 10 has a generally longitudinally extending axis or engine centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by core casing 46, which can be coupled with the fan casing 40.

A drive shaft 51 can rotationally couple the compressor section 22 and the fan section 18 can be operatively coupled to the turbine section 32. The rotation of the turbine section 32 can transfer a rotational force to the drive shaft 51, which can in turn be transferred to at least one of the compressor section 22 or the fan section 18 to drive the compressor section 22 or fan section 18. The drive shaft 51 can rotate about an axis. In the illustrated turbine engine 10, the drive shaft 51 can rotate about the engine centerline 12.

The drive shaft 51 can include separate spools. As a non-limiting example, the drive shaft 51 can include an HP shaft or spool 48 disposed coaxially about the engine centerline 12 of the turbine engine 10 drivingly connects the HP turbine 34 to the HP compressor 26. As a non-limiting example, the drive shaft 51 can include an LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 can together define the drive shaft 51. The spools 48, 50 are rotatable about the engine centerline 12 and coupled to a plurality of rotatable elements, which can collectively define a rotor.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, a plurality of compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disc 61, which is mounted to the corresponding one of the HP and LP spools 48, 50, with each stage having its own disc 61. A plurality of arms 90 extend from the disc 61 of the HP spool 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, a plurality of turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disc 71, which is mounted to the corresponding one of the HP and LP spools 48, 50, with each stage having a dedicated disc 71. The vanes 72, 74 for a stage of the compressor can be mounted to the core casing 46 in a circumferential arrangement.

Complimentary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26 via the drive shaft 51. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as a first and second bleed airflow 77, 79, respectively. The second bleed airflow 79 is fed through a portion of the rotor. The plurality of arms 90 are used to direct the second bleed airflow 79. The first and second bleed airflow 77, 79 can be drawn from the pressurized airflow 76 and provided to engine components requiring cooling. The temperature of pressurized airflow 76 entering the combustor 30 is significantly increased. As such, cooling provided by the first and second bleed airflow 77, 79 is necessary for operating of such engine components in the heightened temperature environments.

A remaining portion of the airflow exiting the fan section, a bypass airflow 78 bypasses the LP compressor 24 and engine core 44 and exits the turbine engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
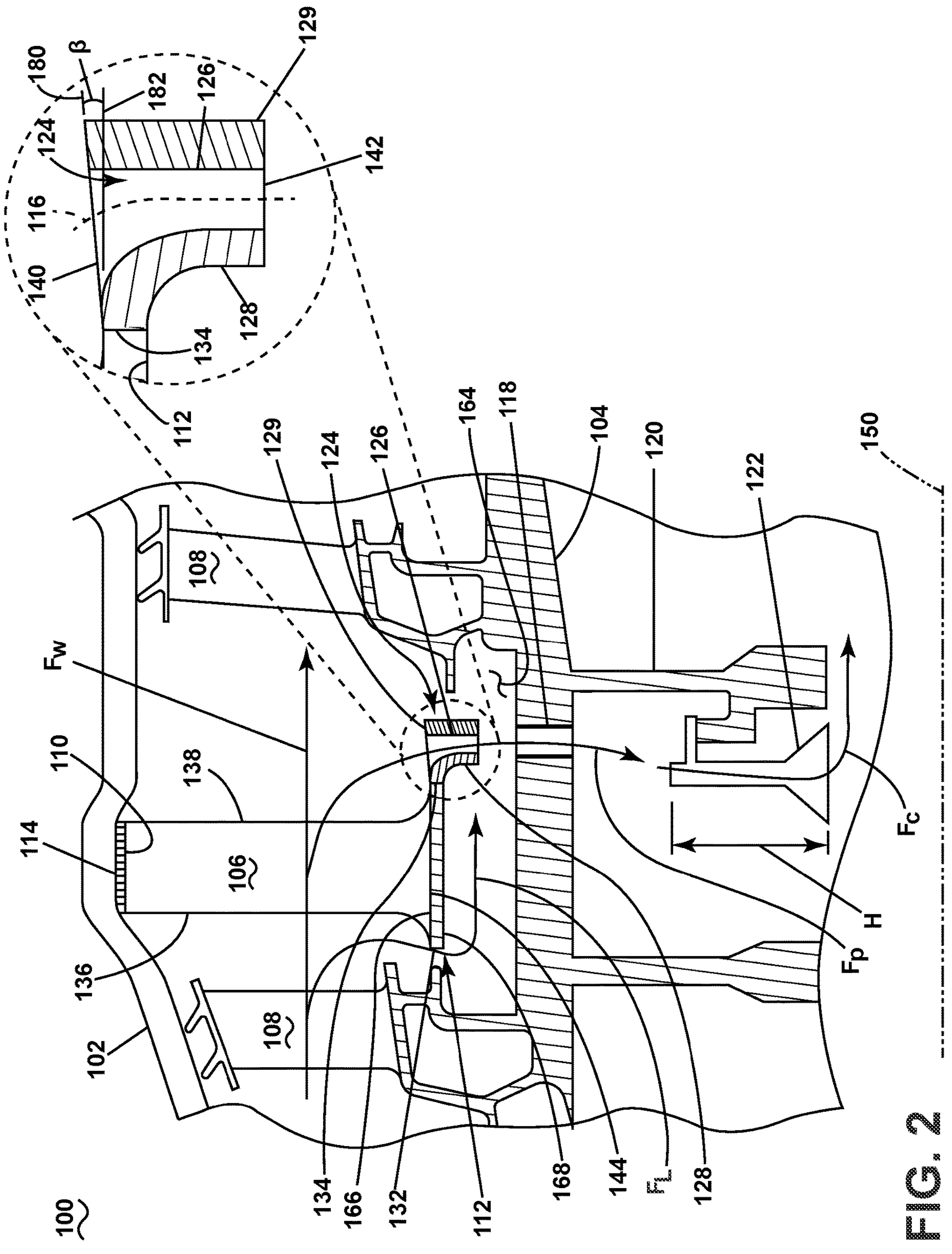
FIG. 2 is schematic side view of an exemplary compressor section suitable for use as the compressor section of FIG. 1, further including a stator, a rotor with a bleed air passage, and an inducer extending from the stator.

FIG. 2 is schematic side view of an exemplary compressor section 100 suitable for use as the compressor section 22 of FIG. 1. Therefore, similar parts of the compressor section 100 and the turbine engine 10 will be given similar names, with it being understood that description of similar parts of the turbine engine 10 applies to the compressor section 100, unless indicated otherwise.

The compressor section 100, as described herein, can be either or both of the LP or HP compressor section 24, 26 (FIG. 1). The compressor section 100 includes a stator 102 and a rotor 104. Alternatively, aspects of the compressor section 100 described herein can be applied to other sections (e.g., the turbine section 32) of the gas turbine engine.

The stator 102 includes a plurality of sets of axially-spaced, circumferentially arranged vanes 106 extending between respective inner bands 112 and outer bands 114. Each vane of the plurality of circumferentially arranged vanes 106 can include a wall extending axially between leading edge 136 and a trailing edge 138 and radially between a tip 110 and a root 144. The tip 110 and the root 144 are operably coupled to or integrally formed with a respective portion of the outer band 114 and the inner band 112, respectively. The inner band 112 is radially spaced from the rotor 104 to define a leakage cavity 164. The inner band 112 extends axially between a leading edge 132 and a trailing edge 134 and radially between a first band surface 166 and a second band surface 168.

The rotor 104 includes a plurality of sets of axially-spaced, circumferentially arranged blades 108 that rotate about a rotational axis 150. The rotational axis 150 can correspond to, be offset from, be parallel to, or non-parallel to the engine centerline 12 (FIG. 1). The rotor 104 further includes a plurality of circumferentially arranged bleed air passages 118.

A plurality of arms 120 extend radially inward from the rotor 104. A tube 122 is operably coupled to or is integrally formed with a portion of the plurality of arms 120. The tube 122 includes a radial height (H).

An inducer 124 directs a flow of fluid into the circumferentially spaced bleed air passages 118. As illustrated, the inducer 124 extends from the stator 102 at an inter-stage location. However, other mounting arrangements are possible, including an intra-stage location. As a non-limiting example, the inducer 124 can be provided as extending axially forward of the leading edge 132 of the inner band 112 or axially aft of the trailing edge 134 of the inner band 112. As a non-limiting example, the inducer 124 can extend through the inner band 112 and be provided axially between or otherwise define at least one of the leading edge 132 or the trailing edge 134 of the inner band 112.

The inducer 124 includes a forward wall 128 and a rear wall 129 axially spaced from the forward wall 128. At least one nozzle passage 126 sits axially between the forward wall 128 and the rear wall 129. The at least one nozzle passage 126 extends radially between a nozzle inlet 140 and a nozzle outlet 142. A centerline 116 extends between the nozzle inlet and the nozzle outlet 142. The centerline 116 is defined as a line extending through the nozzle passage 126 that is equidistant from opposing side walls at all points along the centerline 116. As illustrated, the nozzle passage 126 is a curved passage such that the centerline 116 is non-linear. However, arrangements with linear centerlines are contemplated.

The forward wall 128, the nozzle passage 126 and the rear wall 129 can be integrally formed (e.g., unitarily formed), or affixed to or otherwise non-integrally formed with one another and/or the inner band 112. As a non-limiting example, the forward wall 128 can be affixed to a remainder of the inducer 124 or the inner band 112 via any suitable method such as, but not limited to, welding, adhesion, fastening, brazing, or any other suitable affixing or coupling method. As a non-limiting example, the forward wall 128 can be integrally formed with the inner band 112 and a remainder of the inducer 124 can be coupled to the forward wall 128. As a non-limiting example, the inducer 124 and the inner band 112 can be integrally formed with each other.

The nozzle outlet 142 is radially spaced from, and can be axially aligned, with respect to the rotational axis 150, with at least a portion of the plurality of circumferentially spaced bleed air passages 118. The nozzle inlet 140 can sit flush with the first band surface 166 of the inner band 112.

The nozzle inlet 140 extends from the forward wall 128 at an angle (β) formed between an axial line 182 and a surface line 180 extending along the nozzle inlet 140 from the inducer 124. The angle (β) can be any suitable angle for the given configuration to effect the transfer of airflow toward the bleed air passage 118. As a non-limiting example, the angle (β), formed between the nozzle inlet 140 and the axial line 182, can be greater than or equal −20 degrees and less than or equal to 20 degrees. The angle (β) can be varied to minimize the distortion of the surrounding airflow caused by the introduction of the inducer 124 with respect to a turbine engine that does not include the inducer 124. With the angle (β), formed between the nozzle inlet 140 and the axial line 182, being greater than 0 degrees, the nozzle inlet 140 can be defined as an inclined nozzle inlet 140. With angle (β) being less than 0 degrees, the nozzle inlet 140 can be defined as a declined nozzle inlet 140.

The angle (β) helps the inducer 124, specifically the rear wall 129 of the inducer 124, act as a deflector that is used to turn at least a portion of the air passing through the set of vanes down and into the nozzle inlet 140. In this sense, the angle (β) functions like a deflector or scoop to turn the air. As a non-limiting example, other structures can be used to help turn the airflow into the inducer 124, such as, but not limited to, an extrusion extending radially outward from the rear wall 129.

During operation of the compressor section 100, a working airflow ($F_w$) is fed through the compressor section 100 and flows over the plurality of sets of circumferentially arranged blades and vanes 108, 106. As the working airflow ($F_w$) flows through the turbine engine, at least a portion of the working airflow ($F_w$) will diverge from the working airflow path (e.g., the path in which the plurality of sets of circumferentially arranged blades and vanes 108, 106 extend through). As a non-limiting example, a leakage airflow ($F_L$) can diverge from the working airflow ($F_w$) upstream of a set of circumferentially arranged vanes 106. The leakage airflow ($F_L$) can flow into the leakage cavity 164. Another portion of the working airflow ($F_w$), after flowing over the set of vanes 106, can branch off and flow through the at least one nozzle passage 126 as a passage airflow ($F_p$). The passage airflow ($F_p$) and the leakage airflow ($F_L$) can meet within the leakage cavity 164. The inducer 124, as described herein, is designed to minimize the effect of the passage airflow ($F_p$) and the leakage airflow ($F_L$) meeting in the leakage cavity 164, which will be descried in greater detail below.

At least a portion of the airflow defined as a combination of the passage airflow ($F_p$) and the leakage airflow ($F_L$), can flow back into the working flow path, while another portion, illustrated as the passage airflow ($F_p$), can then be fed through the circumferentially spaced bleed air passages 118 where it can be directed into the tube 122 via the plurality of arms 120 to define a bleed airflow ($F_c$). The bleed airflow ($F_c$) can form the second bleed airflow 79 of FIG. 1. The bleed airflow ($F_c$) is ultimately fed to a downstream portion of the turbine engine (e.g., the turbine section 32 or the combustion section 28 of FIG. 1) to cool a downstream component (e.g., a portion of the compressor section 22 downstream of the inducer 124, the static turbine vanes 72, 74 and/or the turbine blades 68, 70 of FIG. 1).

Figure 3:
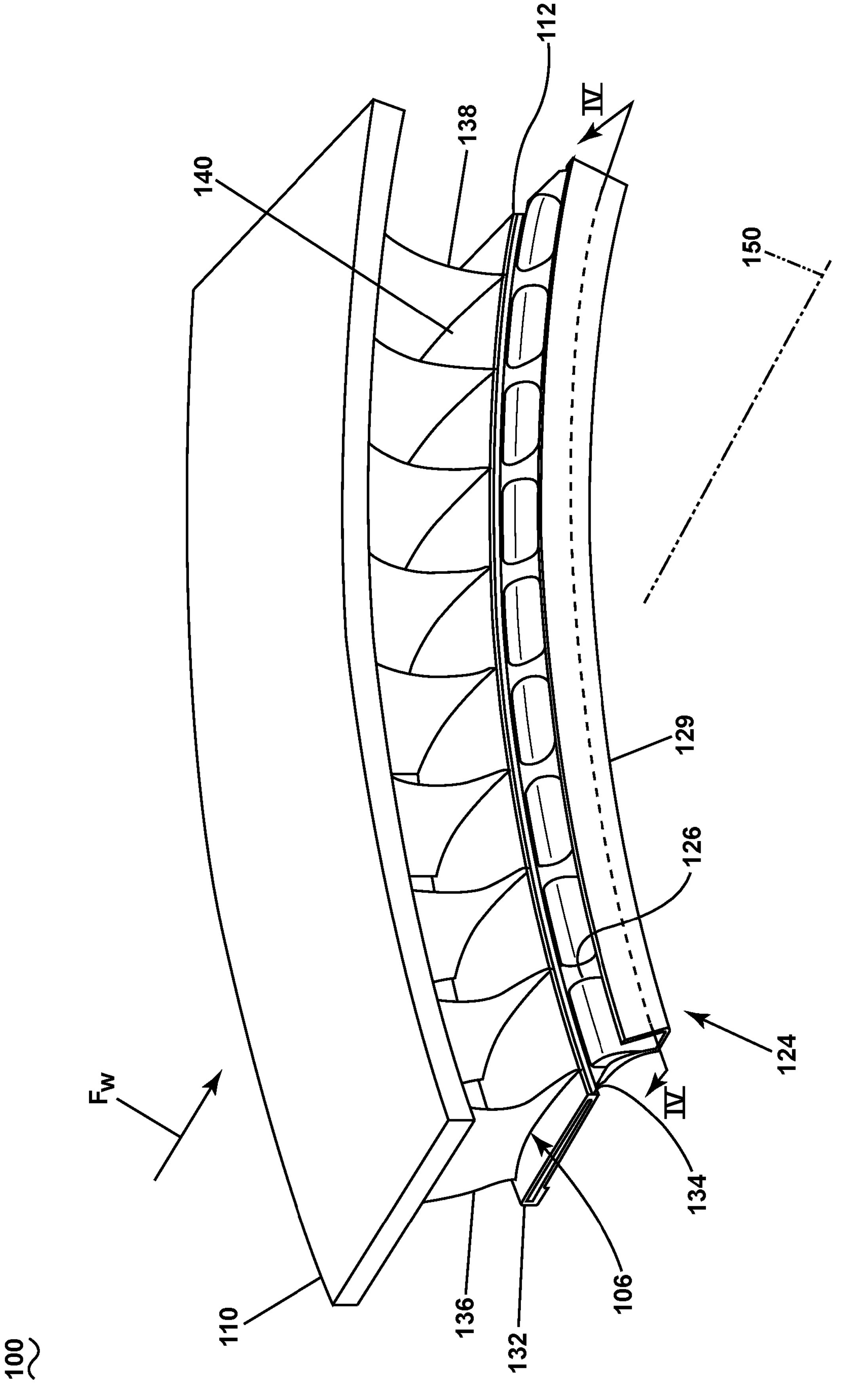
FIG. 3 is a rear-perspective view of the stator and the inducer of FIG. 2, further illustrating a plurality of circumferentially-spaced nozzles of the inducer.

FIG. 3 is a rear-perspective view of a portion of the stator and the inducer 124 of FIG. 2, which better illustrates their relative arrangement. The at least one nozzle passage 126, as illustrated, is included within a plurality of circumferentially-spaced nozzle passages 126 that each extend through a respective portion of the inducer 124. While only a circumferential section of the stator 102 is shown including a single set of circumferentially arranged vanes 106, it will be appreciated that the set of circumferentially arranged vanes 106 are circumferentially spaced about an entirety of the rotational axis 150. The inducer 124 can extend continuously or non-continuously (e.g., in segments) about the entirety of the rotational axis 150. It is contemplated that the inducer 124 need not completely circumferentially extend about the rotational axis 150.

Figure 4:
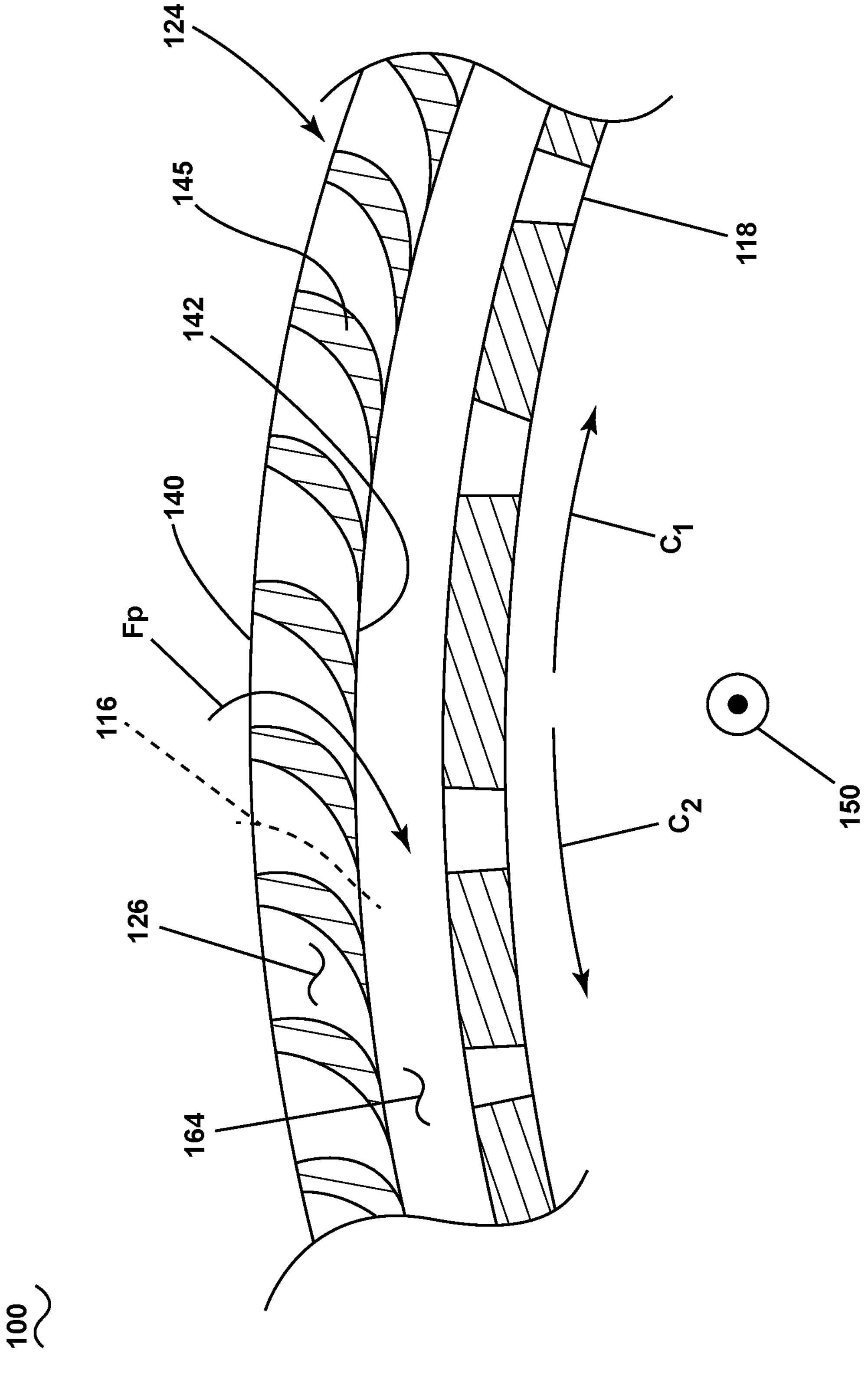
FIG. 4 is a radial cross-sectional view of the inducer seen from sight line IV-IV of FIG. 3, further illustrating an airflow flowing through the plurality of circumferentially-spaced nozzles.

FIG. 4 is a radial cross-sectional view of the inducer 124 seen from section line IV-IV of FIG. 3. Each nozzle passage of the plurality of circumferentially spaced nozzle passages 126 is circumferentially bounded by a plurality of interior walls 145 that extend radially between the nozzle inlet 140 and the nozzle outlet 142 and axially between the forward wall 128 and the rear wall 129.

Each wall of the plurality of interior walls 145 can be identical or non-identical to one another. Each interior wall of the plurality of interior walls 145 is defined by a respective cross-sectional area when viewed along a vertical plane extending perpendicularly and radially from the rotational axis 150 and intersecting the interior wall. The cross-sectional area of each wall can be any suitable cross-sectional area. As a non-limiting example, the cross-sectional area of each interior wall of the plurality of interior walls 145 is an airfoil cross-sectional area (e.g., a cross-sectional area including a pressure side and a suction side or otherwise including a swooping cross-sectional area). With an airfoil cross-section, the interior walls 145 define vanes, which can aid in controlling the direction of the passage airflow ($F_p$).

At the nozzle outlet 142, the centerline 116 is locally non-perpendicular relative to a radial line passing from the rotational axis 150 to a radially adjacent surface of the rotor 104. Each nozzle passage 126 is better defined by a respective passage cross-sectional area that decreases from the nozzle inlet 140 to the nozzle outlet 142.

During operation of the compressor section 100, the working airflow ($F_w$) (FIGS. 2 and 3) is fed into the nozzle inlet 140 as the passage airflow ($F_p$). The passage airflow ($F_p$) follows the curvature defined by the centerline 116. As such, each nozzle passage 126 turns a tangential or circumferential components of the passage airflow ($F_p$) from a first circumferential direction ($C_1$) to a second circumferential direction ($C_2$), which opposes or is opposite the first circumferential direction ($C_1$). As the passage airflow ($F_p$) flows through the nozzle passage 126, the passage airflow ($F_p$) is constricted and accelerated due to the decreasing passage cross-sectional area from the nozzle inlet 140 to the nozzle outlet 142.

The circumferential component of the flow passage airflow ($F_p$) will be discussed herein, however, it will be appreciated that the airflow ($F_p$) can be any suitable airflow with a circumferential vector. For example, the passage airflow ($F_p$) can include radial, axial and circumferential components.

It will be appreciated that the inducer 124 can be formed such that it turns the airflow from the second circumferential direction ($C_2$) to the first circumferential direction ($C_1$), or vice-versa. The way that the inducer 124 turns the passage airflow ($F_p$) is further defined by whether or not the circumferential component of the passage airflow ($F_p$) at the nozzle outlet 142 is parallel or non-parallel to the circumferential component of the rotation of the rotor 104.

Varying whether or not the circumferential component of the passage airflow ($F_p$) at the nozzle outlet 142 is parallel or non-parallel to the circumferential component that the rotor 104 is rotating can provide distinct benefits to directing a portion of the passage airflow ($F_p$) into the rotor 104, with respect to one another. Aligning the circumferential component of the passage airflow ($F_p$) at the nozzle outlet 142 with the circumferential component of the rotor 104 results in a positive swirl (e.g., a swirl from the nozzle outlet 142 that is circumferentially aligned with the circumferential direction that the leakage airflow ($F_L$) flows in within the leakage cavity 164) being generated within the area between the nozzle outlet 142 and the rotor 104. Non-aligning the circumferential component of the passage airflow ($F_p$) at the nozzle outlet 142 with the circumferential component of the rotor 104 results in a negative swirl (e.g., a swirl from the nozzle outlet 142 that is not circumferentially aligned with the circumferential direction that the leakage airflow ($F_L$) flows in within the leakage cavity 164) being generated within the area between the nozzle outlet 142 and the rotor 104. It has been found that a positive swirl results in increased cooling capabilities, while the negative swirl positively affects the pressure of the passage airflow ($F_p$) exiting the nozzle outlet 142 into the leakage cavity 164 and then flowing into a respective bleed air passage of the plurality of bleed air passages 118. Further, the introduction of the positive swirl or the negative swirl further decreases the windage losses associated with the flow passage airflow ($F_p$) merging with a leakage airflow ($F_L$) that is already within the leakage cavity 164.

The positive swirl increases the cooling capabilities or otherwise increases the cooling effectiveness of the portions of the turbine engine defining the leakage cavity 164. This is done by decreasing the shear stress induced by the rotor 104 (by ensuring that the flow passage airflow ($F_p$) relative total temperature is decreased).

The negative swirl decreases the pressure losses associated with the flow passage airflow ($F_p$) merging with the leakage airflow ($F_L$) within the leakage cavity and ultimately flowing into the bleed air passage 118. The negative swirl of the flow passage airflow ($F_p$) within the leakage cavity 164 results in the flow passage airflow ($F_p$) at or within the bleed air passage 118 to not have a swirl. This, ultimately reduces the pressure losses associated with the channeling of the flow path airflow ($F_p$) through the bleed air passage 118.

The swooping cross-sectional area (e.g., the airfoil cross-sectional area) of the plurality of interior walls 145, along with the decreasing cross-sectional area from the nozzle inlet 142 to the nozzle outlet 144 allows for the inducer to be constructed to tailor an air swirl ratio equal to: V/ωr to a desired value. V is the velocity of the passage airflow ($F_p$) exiting the nozzle outlet 142 and flowing into the leakage cavity 164, ω is the angular velocity of the rotor 104, and r is the radial distance between the inlet of the bleed air passage 118 and the rotational axis 150. The inducer 124 is able to create an air swirl ratio of equal to zero. In some instances, the inducer 124 is able to create an air swirl ratio of −0.4 or less. As a non-limiting example, the air swirl ratio can be greater than or equal to −0.5 and less than or equal to 0.5. It is contemplated that the target for the air swirl ratio can be equal to what the air swirl ratio or otherwise how the leakage airflow ($F_L$) acts within the leakage cavity 164 that does not include the inducer 124. In other words; the inducer 124 as described herein, has an air swirl ratio such that it does not negatively impact or otherwise positively impacts (e.g., decrease in windage losses) the leakage airflow ($F_L$) within the leakage cavity 164 when compared to the same turbine engine without the inducer 124.

It has been further found that the implementation of the inducer 124 can result in a decrease in the height (H) of the tube 122 when compared to a turbine engine without the inducer 124, as described herein. As a non-limiting example, the height (H) can be reduced by 30%.

Figure 5:
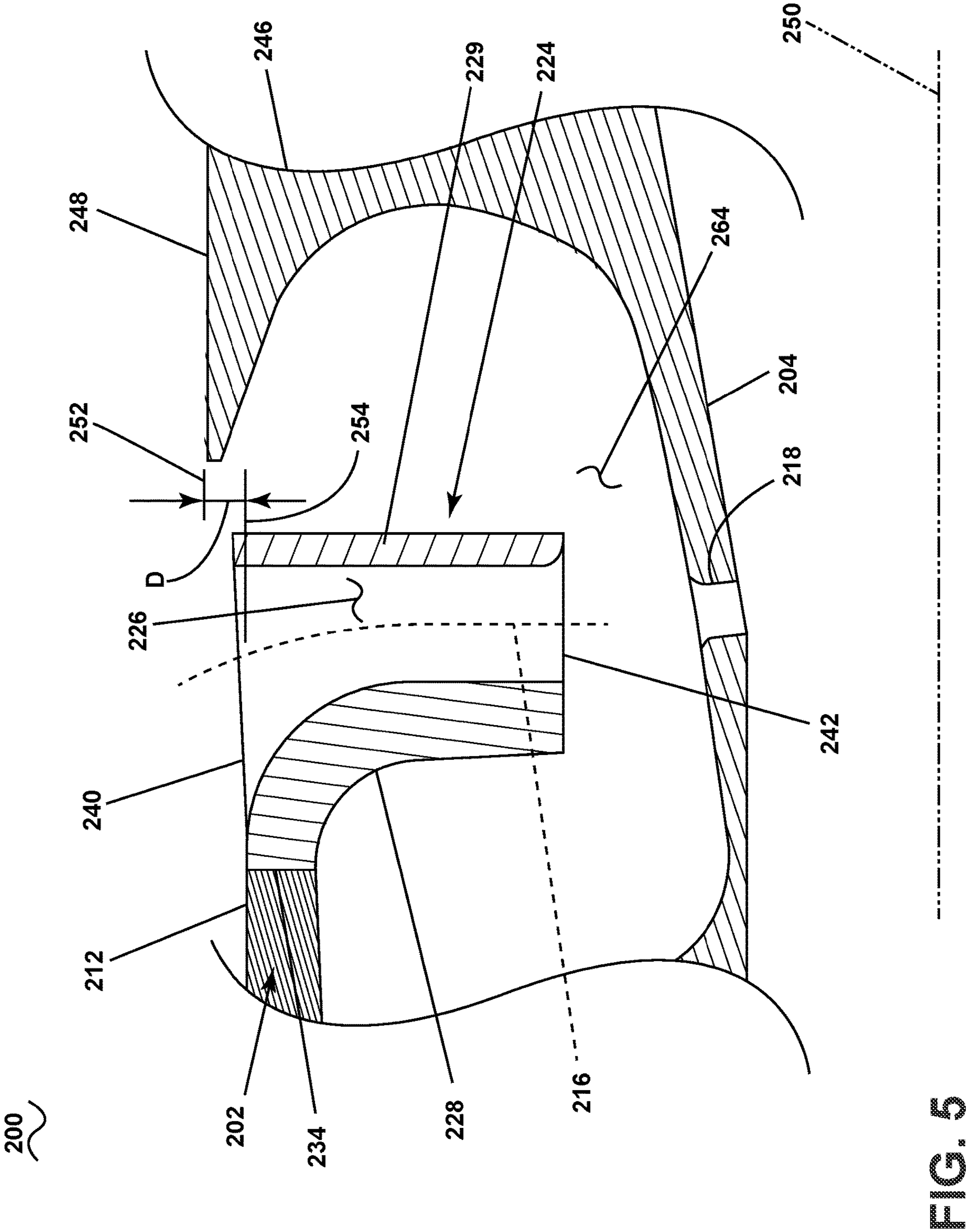
FIG. 5 is schematic side view of an exemplary inducer suitable for use as the inducer of FIG. 2, the exemplary inducer being spaced radially with respect to a surface of a downstream rotating components of the turbine engine.

FIG. 5 is schematic side view of an exemplary inducer 224 suitable for use as the inducer 124 of FIG. 2. The inducer 224 is similar to the inducer 124 therefore, like parts will be identified with like numerals increased to the 200 series, with it being understood that the description of the like parts of the inducer 124 applies to the inducer 224 unless otherwise noted.

The inducer 224 is suitable for use within a compressor section 200 (e.g., within the HP compressor 24 of the LP compressor 26 of FIG. 1). The compressor section includes a stator 202 and a rotor 204 spaced from the stator 202 to define leakage cavity 264 formed therebetween. The rotor 204 includes at least one bleed air passage 218 and rotates about a rotational axis 250. The stator 202 includes an inner band 212 that terminates axially, with respect to the rotational axis 250, at a trailing edge 234. The inducer 224 includes a forward wall 228, a rear wall 229 and at least one nozzle passage 226 extending between a nozzle inlet 240 and a nozzle outlet 242. The inducer 224 includes a centerline 216.

The rotor 204 includes at least one rotor band 246 that is directly coupled to at least one set of blades. The rotor band 246 is directly downstream of the inner band 212. The rotor band 246 includes an upper surface 248.

The inducer 224 is similar to the inducer 124 (FIG. 2), except that the inducer 224 is radially spaced from the upper surface 248 a distance (D). The distance (D) is the radial distance, with respect to the rotational axis 250, between a first axial line 252 extending axially from an upstream edge of the upper surface 248 and a second axial line 254 extending axially from where the nozzle inlet 240 meets the forward wall 228, with respect to the rotational axis 250.

The distance (D) can be any suitable value for a given implementation of the rotor 204 and stator 202. As a non-limiting example, the distance (D) can be greater than or equal to 3 mm and less than or equal to 20 mm. The distance (D) can be a positive or negative distance such that the upper surface 248 is positioned radially outward or radially inward, respectively, from the second axial line 254. The distance (D) can be equal to 0.

The distance (D) can be varied to create a funnel for the flow passage airflow ($F_p$). For example, the positioning of the upper surface 248 at a distance (D) from the nozzle inlet 240 can result in the flow passage airflow ($F_p$) being directed or otherwise funneled into the nozzle inlet 240. Further, the distance (D) can be used to ensure a minimal to non-existent aerodynamic penalty (e.g., pressure losses, windage losses) associated with the introduction of the inducer 224.

Figure 6:
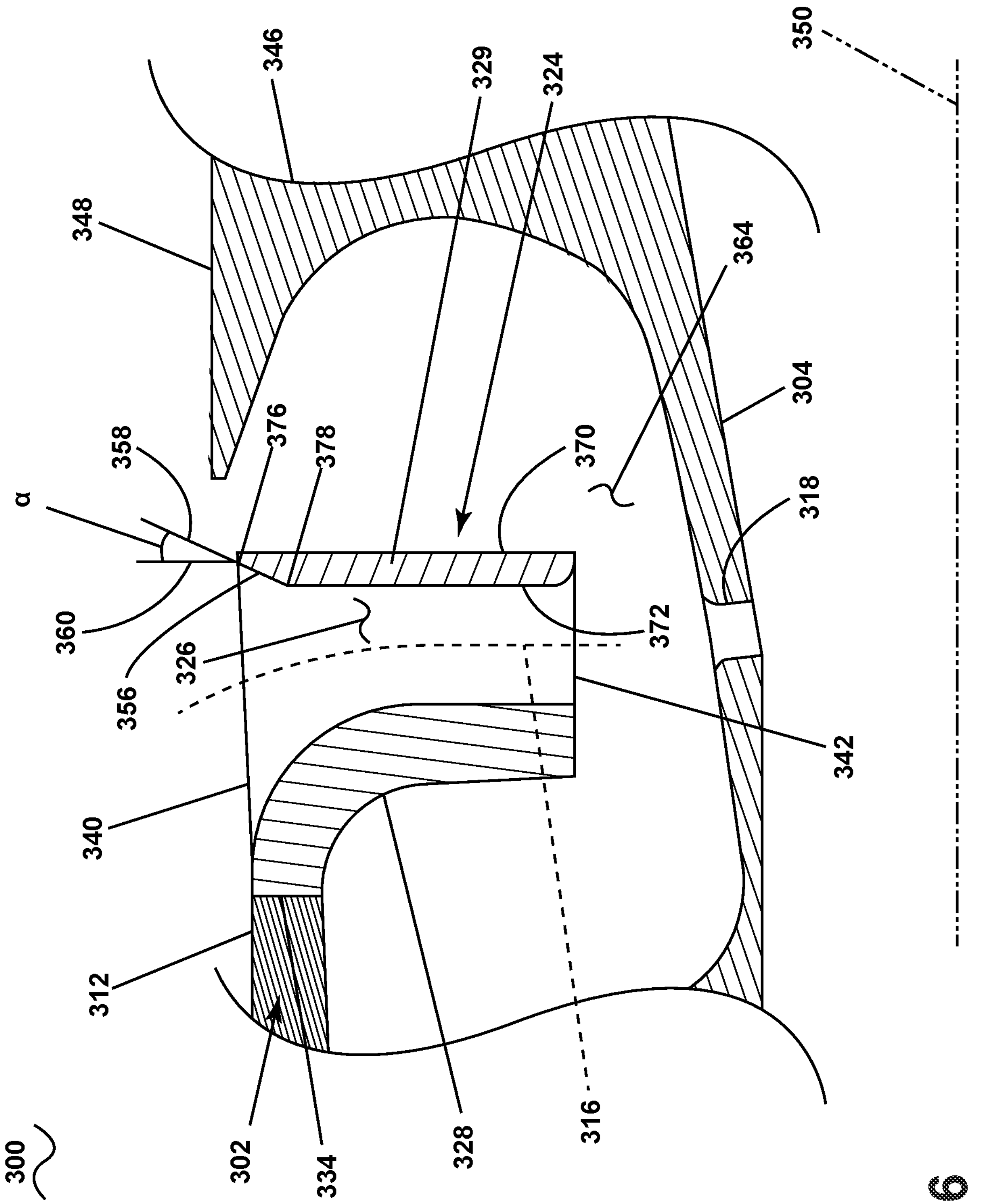
FIG. 6 is schematic side view of an exemplary inducer suitable for use as the inducer of FIG. 2, further including a funnel.

FIG. 6 is schematic side view of an exemplary inducer 324 suitable for use as the inducer 124 of FIG. 2. The inducer 324 is similar to the inducer 124, 224 therefore, like parts will be identified with like numerals increased to the 300 series, with it being understood that the description of the like parts of the inducer 124, 224 applies to the inducer 324 unless otherwise noted.

The inducer 324 is suitable for use within a compressor section 300 (e.g., within the HP compressor 24 of the LP compressor 26 of FIG. 1). The compressor section includes a stator 302 and a rotor 304 spaced from the stator 302 to define leakage cavity 364 formed therebetween. The rotor 304 includes at least one bleed air passage 318 and rotates about a rotational axis 350. The rotor 304 further includes a rotor band 346 with an upper surface 348. The rotor band 346 is directly downstream of the inner band 312 such that the set of circumferentially arranged vanes (not illustrated) coupled to or integrally formed with the inner band 312 form a single stage with the set of circumferentially arranged blades (not illustrated) coupled to or integrally formed with the rotor band 346. The stator 302 includes an inner band 312 that terminates axially, with respect to the rotational axis 350, at a trailing edge 334. The inducer 324 includes a forward wall 328, a rear wall 329 and at least one nozzle passage 326 extending between a nozzle inlet 340 and a nozzle outlet 342. The inducer 324 includes a centerline 316.

The rear wall 329 of the inducer 324 includes a first surface 370 and a second surface 372, axially forward of the first surface 370, with respect to the rotational axis 350. The inducer 324 is similar to the inducer 124 (FIG. 2), 224 (FIG. 5), except that the inducer 324 includes the nozzle passage 326 defining a funnel 356. The funnel 356 is formed at the nozzle inlet 340 and is defined as a surface of the inducer 324 that slopes radially inwardly, with respect to the rotational axis 350, from the nozzle inlet 340 and toward the centerline 316. The funnel 356 can include a constant or non-constant slope. As a non-limiting example, the funnel 356 can extend from the first surface 370, or axially near the first surface 370, and to or axially near the second surface 372. The funnel 356 extends between an upstream edge 376 corresponding to a location where the funnel 356 meets the nozzle inlet 340 and a downstream edge 378 corresponding to a location where the funnel 356 meets the second surface 372 of the rear wall 329. The upstream edge 376, as illustrated, is axially aft of the downstream edge 378.

The funnel 356 extends at a funnel angle (α) formed between a first straight line 358 projecting outwardly from where the funnel 356 meets the nozzle inlet 340 and a second straight line 360 projecting radially outward from where the funnel 356 meets the nozzle inlet 340, with respect to the rotational axis 350. The first straight line 358 is defined by the slope of the funnel 356 where it meets the nozzle inlet 340. The funnel angle (α) can be any suitable angle. As a non-limiting example, the funnel angle (α) can be greater than 0 degrees and less than or equal to 45 degrees As a non-limiting example, the funnel angle (α) can be greater than 0 degrees and less than or equal to 80 degrees While illustrated as a positive funnel angle (α) it will be appreciated that the funnel 356 can extend at a negative funnel angle (α) of less than 0 degrees and greater than or equal to −45 degrees. As a non-limiting example, the funnel angle (α) can be less than 0 degrees and greater than or equal to −80 degrees. In other words, the upstream edge 376 can be axially forward to the downstream edge 378, with respect to the rotational axis 350.

The benefit of including the funnel 356, with respect to the inducer 124, 224, is that the funnel 356 accelerates the flow of fluid (e.g., the passage airflow ($F_p$) of FIG. 2) as it flows through the nozzle inlet 340 and into the nozzle passage 326. The acceleration of the flow of fluid, in turn, allows for a greater tuning capability of the pressure of the flow of fluid as it exits the nozzle outlet 342, which can ultimately be used to ensure that he air swirl ratio falls within a preferred range. Further, the introduction of the funnel 356 eliminates or reduces a flow stagnation point that can be present with the inducer 324 not including the funnel 356. In other words, the funnel 356 can ensure that the passage airflow ($F_p$) seamlessly flows into the nozzle passage 326 (e.g., the flow passage airflow ($F_p$) does not diverge from the nozzle passage 326).

Figure 7:
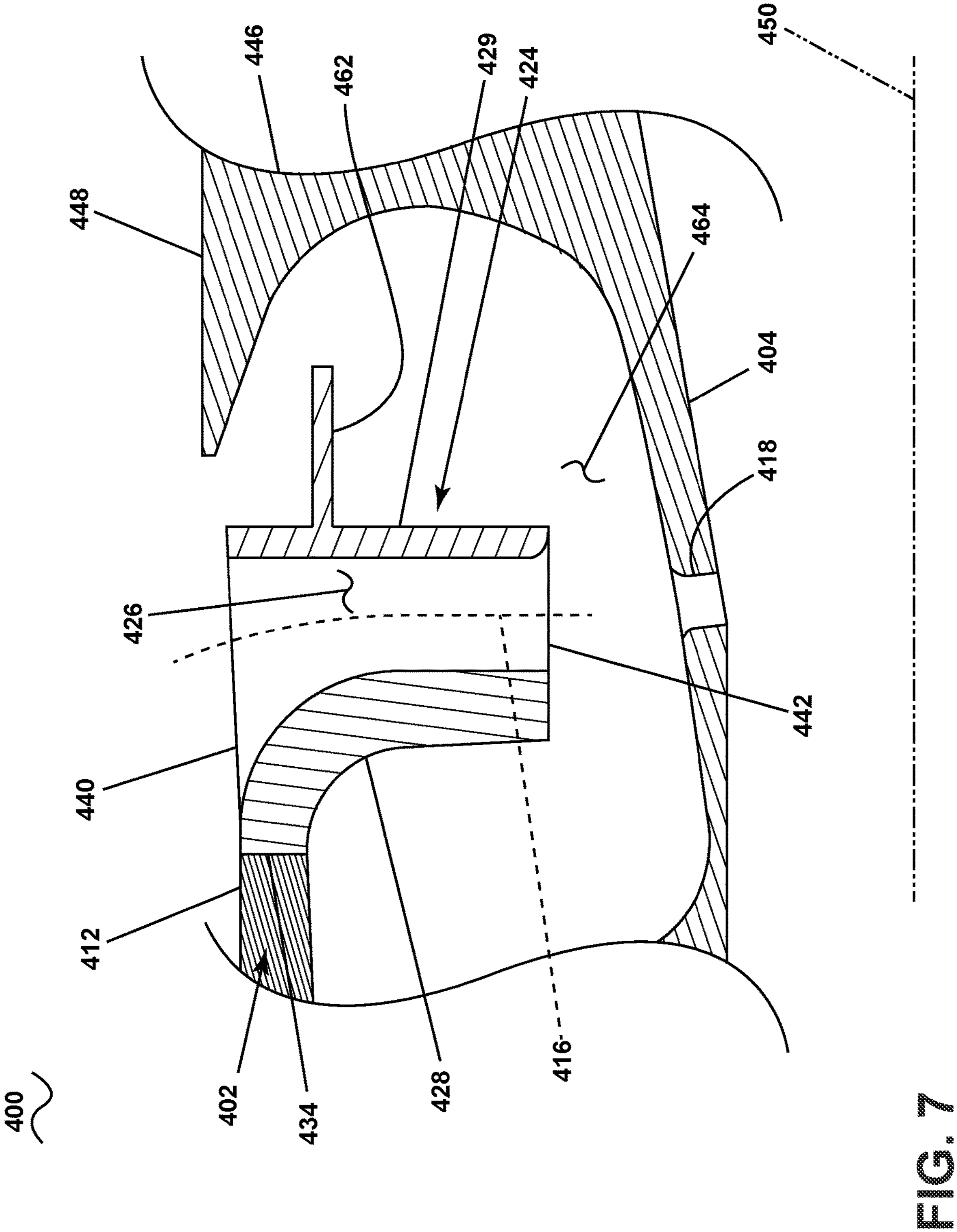
FIG. 7 is schematic side view of an exemplary inducer suitable for use as the inducer of FIG. 2, further including an angel wing.

FIG. 7 is schematic side view of an exemplary inducer 424 suitable for use as the inducer 124 of FIG. 2. The inducer 424 is similar to the inducer 124, 224, 324 therefore, like parts will be identified with like numerals increased to the 400 series, with it being understood that the description of the like parts of the inducer 124, 224, 324 applies to the inducer 424 unless otherwise noted.

The inducer 424 is suitable for use within a compressor section 400 (e.g., within the HP compressor 24 of the LP compressor 26 of FIG. 1). The compressor section includes a stator 402 and a rotor 404 spaced from the stator 402 to define leakage cavity 464 formed therebetween. The rotor 404 includes at least one bleed air passage 418 and rotates about a rotational axis 450. The rotor 404 further includes a rotor band 446 with an upper surface 448. The rotor band 446 is directly downstream of the inner band 412 such that the set of circumferentially arranged vanes (not illustrated) coupled to or integrally formed with the inner band 412 form a single stage with the set of circumferentially arranged blades (not illustrated) coupled to or integrally formed with the rotor band 446. The stator 402 includes an inner band 412 that terminates axially, with respect to the rotational axis 450, at a trailing edge 434. The inducer 424 includes a forward wall 428, a rear wall 429 and at least one nozzle passage 426 extending between a nozzle inlet 440 and a nozzle outlet 442. The inducer 424 includes a centerline 416.

The inducer 424 is similar to the inducer 124 (FIG. 2), 224 (FIG. 5), 324 (FIG. 6), except that the inducer 424 includes an angel wing 462 extending from the inducer 424. The angel wing 462, as a non-limiting example, can extending axially, with respect to the rotational axis 450, from the inducer 424. The angel wing 462 can extend into the leakage cavity 464 and be used to create a tortuous path for a leakage airflow within the leakage cavity 464 flowing between the rotor 404 and the inducer 424.

Benefits of the present disclosure include a turbine engine having a higher efficiency when compared to a conventional turbine engine. For example, the conventional turbine engine utilizes structures formed within the rotor or within the stator to direct bleed air into the bleed air passages of the rotor. Due to the conservation of angular momentum, as the bleed air is fed to a rotating component (e.g., the rotor including the channel) from a stationary component including the structure (e.g., a vane), the pressure of the bleed air drops and vortex swirl occurs in the region between the structure and the channel of the rotor. The reduction of pressure and introduction of the vortex swirl ultimately results in pressure and windage losses, which ultimately reduces the overall efficiency of the turbine engine. The inducer, as described herein, however, is able to direct the flow of fluid such that a circumferential component of the flow of fluid at the nozzle outlet and the inlet of the bleed air passage is either parallel or non-parallel to the circumferential direction that the rotor rotates. This redirection is used to ensure that the airflow ratio is tailored to a specific, desired value, thereby resulting in relatively low windage losses, pressure losses, and increased cooling efficiency when compared to the conventional turbine engine. As a non-limiting example, it has been found that the use of the inducer, as described herein, can result in a reduction in pressure losses when compared to the conventional turbine engine. The reduction in windage losses and pressure losses, along with the increased cooling efficiency results in a more efficient turbine engine when compared to the conventional turbine engine. Specifically, it has been found that the implementation of the inducer, as described herein, can result in an up to 0.1% decrease in specific fuel consumption when compared to the conventional turbine engine.

Further, as described herein, the implementation of the inducer can result in the decrease in the height of the tube, which is used to direct the bleed air to downstream portions of the turbine engine. This decrease in height, in relation to the height needed for the tube in the conventional turbine engine, results in a decrease in weight of the turbine engine. The decrease in weight ultimately results in the overall efficiency of the turbine engine being further increased in comparison with the conventional turbine engine.

To the extent not already described, the different features and structures of the various aspects can be used in combination, or in substitution with each other as desired. That one feature is not illustrated in all of the examples is not meant to be construed that it cannot be so illustrated but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine comprising a rotor rotatable about a rotational axis and having a plurality of sets of circumferentially arranged blades axially spaced along the rotational axis from one another, a stator having an inner band, an outer band, and a plurality of sets of circumferentially arranged vanes extending between the inner band and the outer band, with each set of circumferentially arranged vanes being provided axially between two sets of circumferentially arranged blades, a plurality of circumferentially spaced bleed air passages extending through the rotor and being located between an axially adjacent set of vanes and blades, and an inducer located axially between the axially adjacent set of vanes and blades, the inducer comprising a set of circumferentially spaced nozzles having a nozzle inlet facing the stator and a nozzle outlet facing the plurality of circumferentially spaced bleed air passages, and a nozzle passage fluidly coupling the nozzle inlet to the nozzle outlet, wherein the nozzle passage defines a centerline that is locally non-perpendicular to the rotor to thereby turn a passage airflow in the nozzle passage from having a first circumferential component at the nozzle inlet to having a second circumferential component at the nozzle outlet, the second circumferential component being opposite the first circumferential component.

An airfoil assembly circumferentially extending across a portion of an axial centerline, the airfoil assembly comprising a band, and an inducer operably coupled to the band and comprising a set of circumferentially spaced nozzles having a nozzle inlet and a nozzle outlet, and a nozzle passage fluidly coupling the nozzle inlet to the nozzle outlet, wherein the nozzle passage defines a centerline that is locally non-perpendicular to the rotor to thereby turn a passage airflow in the nozzle passage from having a first circumferential component at the nozzle inlet to having a second circumferential component at the nozzle outlet, the second circumferential component being opposite the first circumferential component.

The turbine engine of any preceding clause, wherein the rotor defines a direction of rotation having a third circumferential component parallel to the second circumferential component.

The turbine engine of any preceding clause, wherein the rotor defines a direction of rotation having a third circumferential component non-parallel to the second circumferential component.

The turbine engine of any preceding clause, wherein the nozzle outlet is axially aligned with the plurality of circumferentially spaced bleed air passages.

The turbine engine of any preceding clause, wherein the inner band includes a first band surface and a second band surface radially opposite the first band surface, with respect to the rotational axis, and the nozzle inlet is flush with the first band surface.

The turbine engine of any preceding clause, wherein the nozzle inlet either extends radially outward from the first band surface at an angle of greater than 0 degrees and less than or equal to 20 degrees, or extends radially inward from the first band surface at an angle of less than 0 degrees and greater than or equal to −20 degrees.

The turbine engine of any preceding clause, wherein the inducer is affixed to the inner band.

The turbine engine of any preceding clause, wherein the inducer includes a forward wall that extends from the inner band and defines an axially forward wall of the nozzle passage.

The turbine engine of any preceding clause, wherein the inducer is integrally formed with the inner band.

The turbine engine of any preceding clause, wherein the set of circumferentially spaced nozzles define an airfoil cross-sectional area when viewed along a circumferential plane intersecting the set of circumferentially spaced nozzles.

The turbine engine of any preceding clause, wherein the inducer further comprises an angel wing extending axially outward from the inducer.

The turbine engine of any preceding clause, wherein the nozzle passage defines a funnel that converges radially inwardly from the nozzle inlet and toward the centerline of the nozzle passage.

The turbine engine of any preceding clause, wherein the funnel extends at an angle with respect to a radial line extending from the centerline at the nozzle inlet, with the angle being greater than 0 degrees and less than or equal to 45 degrees.

The turbine engine of any preceding clause, wherein the inner band extends axially between a leading edge and a trailing edge and the inducer is operably coupled to the trailing edge.

The turbine engine of any preceding clause, further comprising a compressor section, a combustor section, and a turbine section in serial flow arrangement, with the stator being provided within the compressor section, and the plurality of circumferentially spaced bleed air passages being fluidly coupled to at least one of the combustor section or the turbine section.

The turbine engine of any preceding clause, wherein inner band extends between a leading edge and a trailing edge and the inducer is provided axially between or otherwise defines the leading edge or the trailing edge of the inner band.

The airfoil assembly of any preceding clause, wherein the inducer is affixed or integrally formed with the band.

The airfoil assembly of any preceding clause 7, wherein the set of circumferentially spaced nozzles includes an airfoil cross-sectional area when viewed along a circumferential plane intersecting the set of circumferentially spaced nozzles.

The airfoil assembly of any preceding clause, wherein the nozzle inlet either extends radially outward from the band at an angle of greater than 0 degrees and less than or equal to 20 degrees, or extends radially inward from the band at an angle of less than 0 degrees and greater than or equal to −20 degrees.

What is claimed is:

1. A turbine engine comprising:

a rotor rotatable about a rotational axis and having a blade, the blade including a blade leading edge and a blade trailing edge;

a stator having an inner band, an outer band, and a vane extending between the inner band and the outer band, the vane being provided axially forward of the blade, with respect to the rotational axis, the vane including a vane leading edge and a vane trailing edge;

a bleed air passage extending through the rotor and being located axially between the vane and the blade; and an inducer provided along the inner band, the inducer comprising:

a nozzle having a nozzle inlet and a nozzle outlet, the nozzle outlet facing the bleed air passage, with at least one of the nozzle inlet or the nozzle outlet being provided entirely axially between the vane trailing edge and the blade leading edge; and a nozzle passage fluidly coupling the nozzle inlet to the nozzle outlet, the nozzle passage having a centerline that is locally non-perpendicular to the rotor, the nozzle passage being shaped to turn a passage airflow in the nozzle passage from having a first circumferential component at the nozzle inlet to having a second circumferential component at the nozzle outlet, the second circumferential component being opposite the first circumferential component.

2. The turbine engine of claim 1, wherein the rotor defines a direction of rotation having a third circumferential component that is the same as the second circumferential component.

3. The turbine engine of claim 1, wherein the rotor defines a direction of rotation having a third circumferential component different from the second circumferential component.

4. The turbine engine of claim 1, wherein the nozzle outlet is axially aligned with the bleed air passage.

5. The turbine engine of claim 1, wherein:
the inner band includes a first band surface and a second band surface radially opposite the first band surface, with respect to the rotational axis; and
the nozzle inlet is flush with the first band surface.

6. The turbine engine of claim 1, wherein the inner band includes a first band surface and a second band surface radially opposite the first band surface, with respect to the rotational axis; and
the nozzle inlet either:
extends radially outward from the first band surface at an angle of greater than 0 degrees and less than or equal to 20 degrees; or
extends radially inward from the first band surface at an angle of less than 0 degrees and greater than or equal to −20 degrees.

7. The turbine engine of claim 1, wherein the inducer is coupled to the inner band.

8. The turbine engine of claim 1, wherein the inducer is integrally formed with the inner band.

9. The turbine engine of claim 1, wherein the nozzle includes an airfoil cross-sectional area when viewed along a circumferential plane intersecting the nozzle.

10. The turbine engine of claim 1, wherein the inducer further comprises an angel wing extending axially outward from the inducer.

11. The turbine engine of claim 1, wherein the nozzle passage defines a funnel that converges radially inwardly from the nozzle inlet and toward the centerline of the nozzle passage.

12. The turbine engine of claim 11, wherein the funnel extends at an angle with respect to a radial line extending from the centerline at the nozzle inlet, with the angle being greater than 0 degrees and less than or equal to 45 degrees.

13. The turbine engine of claim 1, further comprising a compressor section, a combustor section, and a turbine section in serial flow arrangement, with the stator being provided within the compressor section, and the bleed air passage is fluidly coupled to at least one of the combustor section or the turbine section.

14. The turbine engine of claim 1, wherein the inner band includes an inner surface confronting the rotor, and the nozzle passage extends radially inward towards the rotor, with respect to the inner surface.

15. An airfoil assembly comprising:
a band;
an airfoil extending from the band, the airfoil having a leading edge and a trailing edge; and
an inducer provided along the band, the inducer comprising:
a nozzle having a nozzle inlet and a nozzle outlet, with at least one of the nozzle inlet or the nozzle outlet being provided entirely axially aft of the trailing edge; and
a nozzle passage fluidly coupling the nozzle inlet to the nozzle outlet, the nozzle passage having a curved centerline extending from the nozzle inlet to the nozzle outlet.

16. The airfoil assembly of claim 15, wherein the nozzle includes an airfoil cross-sectional area when viewed along a circumferential plane intersecting the nozzle.

17. The airfoil assembly of claim 15, wherein the nozzle inlet either extends radially outward from the band at an angle of greater than 0 degrees and less than or equal to 20 degrees, or extends radially inward from the band at an angle of less than 0 degrees and greater than or equal to −20 degrees.

18. The airfoil assembly of claim 15, wherein the airfoil assembly is included in a turbine engine having an engine centerline, and the curved centerline is curved when from a plane that is perpendicular to the engine centerline and intersecting the curved centerline at the nozzle outlet.

19. An airfoil assembly comprising:
a band including a first band surface and a second band surface opposite the first band surface;
an airfoil extending from the band, the airfoil having a leading edge and a trailing edge; and
an inducer provided along the band, the inducer comprising:
a nozzle having a nozzle inlet and a nozzle outlet, the nozzle inlet extends radially outward from the first band surface at an angle that has an absolute value of greater than 0 degrees and less than or equal to 20 degrees; and
a nozzle passage fluidly coupling the nozzle inlet to the nozzle outlet, the nozzle passage having a curved centerline extending from the nozzle inlet to the nozzle outlet.

20. The airfoil assembly of claim 19, wherein the airfoil assembly is included in a turbine engine having an engine centerline, and the curved centerline is curved when from a plane that is perpendicular to the engine centerline and intersecting the curved centerline at the nozzle outlet.

* * * * *